| United States Patent [19] | [11] | 4,152,503 |
|---|---|---|
| Short et al. | [45] | May 1, 1979 |

[54] CATALYST SUPPORT PREPARED BY ALCOHOL TREATMENT OF HYDROGELS

[75] Inventors: James N. Short; Donald R. Witt, both of Bartlesville, Okla.

[73] Assignee: Phillips Petroleum Company, Bartlesville, Okla.

[21] Appl. No.: 864,112

[22] Filed: Dec. 23, 1977

Related U.S. Application Data

[62] Division of Ser. No. 667,935, Mar. 18, 1976, Pat. No. 4,081,407.

[51] Int. Cl.$^2$ .......................... C08F 4/02; C08F 4/24; C08F 10/00; C08F 10/02
[52] U.S. Cl. ...................... 526/106; 423/338; 423/339; 526/130; 526/352; 526/905
[58] Field of Search ...................... 526/106, 130, 905

[56] References Cited

U.S. PATENT DOCUMENTS

| 3,562,241 | 2/1971 | Witt | 526/106 |
| 3,867,306 | 2/1975 | Witt et al. | 252/452 |
| 3,890,249 | 6/1975 | Dietz et al. | 252/458 |
| 3,900,457 | 8/1975 | Witt | 526/106 |
| 3,951,863 | 4/1976 | Delap | 526/106 |
| 4,042,769 | 8/1977 | Lynch | 526/106 |
| 4,042,770 | 8/1977 | Bachl et al. | 526/106 |
| 4,048,414 | 9/1977 | Frielingsdorf et al. | 526/106 |
| 4,092,468 | 5/1978 | Gruber et al. | 526/106 |

FOREIGN PATENT DOCUMENTS

| 570981 | 3/1959 | Belgium | 526/106 |
| 2411668 | 9/1975 | Fed. Rep. of Germany | 526/106 |
| 2411734 | 9/1975 | Fed. Rep. of Germany | 526/106 |

*Primary Examiner*—Alan Holler

[57] ABSTRACT

A method is provided for treating a hydrogel with a saturated, aliphatic alcohol selected from the group consisting of 1-pentanol, 2-pentanol, 3-methyl-1-butanol, 4-methyl-2-pentanol, 2,2-dimethyl-1-propanol and 1-hexanol to remove water thereby producing a dried product that retains a porous structure and is particularly suitable upon impregnation with a polymerization catalyst for use in promoting the production of ethylene polymers of melt index in excess of about 6.6.

12 Claims, No Drawings

CATALYST SUPPORT PREPARED BY ALCOHOL TREATMENT OF HYDROGELS

This is a divisional application of copending application having Ser. No. 667,935, filed on Mar. 18, 1976 now U.S. Pat. No. 4,081,407.

BACKGROUND OF THE INVENTION

This invention relates to the removal of water from a hydrogel. In one of its aspects this invention relates to the production of dried porous structures suitable for catalyst support. In another of its aspects this invention relates to a polymerization with chromium-containing catalysts supported on a substrate prepared from a hydrogel. In yet another of its aspects this invention relates to the production of ethylene polymers having a melt index in excess of about 6.6.

The preparation of chromium-containing polymerization catalysts supported on substrates prepared from hydrogels is well known. The preparation of hydrogels and removal of water therefrom to produce these substrates has been described in a variety of methods. The impregnation of polymerization catalysts onto supporting substrates is also well known. Up to this time, however, the methods for producing a chromium-containing catalyst impregnated upon a support for polymerization of ethylene polymers has not shown means by which a melt index of at least 6.6 can be obtained.

In U.S. Pat. No. 3,890,249 a method of producing a xerogel which is used as catalyst support in ethylene polymerization is set out in which large pore support is produced by dehydration of the hydrogel using any solvent in which water is partly soluble as a dehydration treatment agent. We have discovered that the solvent used in such a treatment of the hydrogel support to remove water therefrom can clearly affect the melt index of the polymer produced in polymerization reactions using a catalyst supported on strata produced from the hydrogel.

It is an object of this invention to provide a method for removing water from a hydrogel which will provide retention of porous structure in the dried product. It is another object of this invention to provide a substrate suitable as a catalyst support. It is yet another object of this invention to provide a supported chromium-containing catalyst suitable for producing polymers of ethylene having melt index in excess of 6.6.

Other aspects, objects and the various advantages of this invention will become apparent upon reading the disclosure of this specification and appended claims.

STATEMENT OF THE INVENTION

In accordance with this invention a method is provided for removing water from a hydrogel so that the porous structure of the gel is retained in the dried product. In this method the hydrogel is treated with an aliphatic alcohol chosen from among the group consisting of 1-pentanol, 2-pentanol, 3-methyl-1-butanol, 4-methyl-2-pentanol, 2,2-dimethyl-1-propanol and 1-hexanol to remove water from the hydrogel and then the alcohol is removed from the water-free gel to recover a solid, particulate material suitable as polymerization catalyst support.

In an embodiment of the invention the catalyst support produced by drying a hydrogel is impregnated with a suitable polymerization catalyst, such as a chromium compound, and the composite after calcination in air is used in the production of polymers of ethylene having higher melt index than that produced using methods of supported catalyst preparation previously known to those skilled in the art. In particular, the catalyst is used for polymerizing ethylene, either alone or with at least one comonomer selected from an aliphatic 1-olefin containing from 3 to 8 carbon atoms per molecule, a diolefin containing from 4 to 5 carbon atoms per molecule and mixtures thereof. The resulting polymers are normally solid, high molecular weight resins which can be molded, extruded, etc. into useful products. In these polymers, the ethylene content ranges from about 80 to about 100 mole percent.

The hydrogels contemplated in this invention are generally the inorganic gels which can be converted into products usefully employed as catalysts or as catalyst supports in various hydrocarbon conversion processes. Examples are the hydrogels formed from the precipitation of the oxides of aluminum, germanium, iron, molybdenum, silicon, tin, titanium, tungsten, vanadium and zirconium and combinations thereof. However, the silica-containing hydrogels are of particular interest in this invention. Exemplary of these are silica, silica-alumina, silica-chromia, silica-magnesia, silica-titania, silica-zirconia, silica-chromia-titania, and the like. The silica content of the various cogels, tergels, etc., on a dry basis, will generally range from about 80 to about 99.8 wt. %, more preferably from about 90 to about 98 wt. %.

Although other methods are known and do not form a part of this invention the silica-containing hydrogels of this invention are preferably formed by introducing an aqueous solution of a silicate compound or compounds such as sodium silicate, potassium silicate and lithium silicate into an aqueous solution of an acid such as a carboxylic acid, mineral acid, acid salt, i.e., ammonium sulfate and carbon dioxide, under conditions suitable for forming a hydrogel. In making the cogels and tergels, a suitable amount of an appropriate water-soluble salt of a catalytic or promoting nature can be incorporated in either the silicate solution or acid solution. For example, the acid solution can contain chromium trioxide, chromium nitrate, and the like and combinations thereof. Alternately, a silica hydrogel, after aging and washing to remove soluble impurities, can be impregnated with an aqueous solution of the desired catalytic agent or agents prior to the alcohol treatment. An example of such a compound is chromium acetate.

The resulting hydrogel is preferably aged for at least one hour at an elevated temperature, i.e., 60°-95° C., after which soluble impurities such as sodium sulfate, etc. are washed out by exchange with a dilute aqueous solution of ammonium nitrate as is known in the art. Generally, the amount of interfering ion or ions is less than about 0.1 wt. % based on the dry weight of the gel following this treatment. Additionally, the treated hydrogel can be further washed with distilled water or deionized water. The purified hydrogel is then ready for the alcohol treatment of this invention.

The alcohols used in this invention are saturated, aliphatic alcohols containing 5 and 6 carbon atoms per molecule selected from the group consisting of 1-pentanol, 2-pentanol, 3-methyl-1-butanol, 4-methyl-2-pentanol, 2,2-dimethyl-1-propanol and 1-hexanol. The treating process for removal of water from the hydrogel can be carried out with the chosen alcohol by azeotrope distillation or by using batch or continuous liquid-phase extraction at about room temperature, i.e., 25° C., and a suitable pressure or, preferably, at an elevated temperature and pressure. The pressure can range from about 1 to about 500 psig (6.9 to 3447 kPa), preferably from about 10 to about 250 psig (69 to 1724 kPa) and the temperature can range from about 60° F. to about 350° F. (16° C.–177° C.), preferably from about 150° F. to about 280° F. (66° F.–138° C.). A description of such a process is given in U.S. Pat. No. 3,890,249.

Following the alcohol treatment, the treated gel is recovered and the alcohol removed by evaporation, flashing, etc. The addition of a chromium compound can be accomplished, if desired, by impregnation with a nonaqueous solution, for example, by a hydrocarbon solution of t-butylchromate. Whether chromium is added at this point in the preparation, or in a prior step, the amount should be in the range of about 0.1 to 10 or more weight percent chromium as chromium oxide, based on total weight of catalyst composition, although amounts as high as 50 weight percent have been employed. Aqueous solutions are not employed in contacting the treated dry gel since water will harm the porous structure thereby affecting performance of the catalyst formed from the treated gel in catalyzing the formation of high melt index ethylene polymer in a particle form polymerization process. High melt index in this context means a value in excess of about 6.6 as determined according to the procedure of ASTM D1238-62T, condition E. The dry product after the alcohol treatment and the impregnation with a nonaqueous solution of a chromium compound is then calcined in a substantially dry, molecular oxygen-containing gas such as air at a temperature between about 350°–2000° F. (177°–1093° C.) for a time sufficiently long to activate the catalyst for polymerization so that at least a portion of the chromium is in the hexavalent state, i.e., from about 1–50 hours. The recovered product is then employed in the polymerization process.

The particle form polymerization process for which the supported catalysts of this invention are particularly suited is, itself, described in U.S. Pat. Nos. 3,098,917 and 3,622,521, incorporated herein by reference. Generally, the polymerization temperature will range from about 100° to about 250° F. (38°–121° C.) using pressures ranging from about 100 to about 700 psia or higher (689–4826 kPa), and catalyst concentrations of about 0.001 to about 10 wt. % based on the weight of reactor contents. The reaction is carried out in a liquid hydrocarbon diluent such that, since substantially all the polymer formed is insoluble in the diluent, the polymer produced is in solid particle form. The diluent is a paraffin or cycloparaffin having from 3–12 carbon atoms per molecule. Examples of such diluents include propane, isobutane, n-decane, cyclohexane, and the like. Optionally, hydrogen can be present in the reactor although its presence is not required to obtain the high melt index ethylene polymers produced over the catalyst prepared according to this invention.

EXAMPLE I

A solution of sodium silicate was introduced with stirring into a solution of sulfuric acid containing dissolved titanyl sulfate to form a hydrogel cogel at about 70° F. (21° C.) and a pH of about 6.8. The solids content of the hydrogel was 8 wt. %. On a dry basis, the purified silica-titania cogel contained 2.5 wt. % titanium, calculated as the metal, and weighed 25 lbs. (11.8 kg). The hydrogel was aged 4 hours at 170° F. (77° C.), repeatedly washed with an aqueous solution containing 1 wt. % ammonium nitrate to lower the sodium content to 0.1 wt. % and finally washed with deionized water. The hydrogel was then impregnated with an aqueous solution of chromium acetate sufficient to give 1 wt. % chromium, calculated as the metal, on a dry basis of the total weight of the composition. The purified hydrogel now containing the chromium compound was composed of 13.2 wt. % solids and 86.8 wt. % water. It was divided into a plurality of portions, each portion of which was individually treated according to the invention with a specified organic compound substantially to remove the molecular water associated with the hydrogel.

Two procedures were employed to separate the water from the hydrogel. In one procedure, a 70 g sample was placed in a container fitted for distillation along with the organic compound and azeotropic distillation was continued until the condensing liquid was clear indicating that no more water was separating. The time required to reach this point was noted. Separated organic liquid was returned to the center of the column as it separated. At the end point, the solvent remaining in the container was allowed to boil off and the dry, powdery product was recovered. In the second procedure, a 200 g hydrogel sample and the extracting liquid were charged to a stainless steel extraction system employing 1¼" (3.2 cm) pipe section equipped with a thermowell and a porous support for the hydrogel bed. Means were provided for heating the pipe section, for circulating liquids, for cooling the effluent from the bed and for separating the water from the effluent by means of a conventional phase separator. In each run, the organic liquid chosen was circulated through the hydrogel bed at a temperature of 220° F. (104° C.), a pressure of 55 psig (379 kPa) and at a rate of about 1400 ml/hour. The effluent stream was cooled at 60° F. (16° C.) and passed through the phase separator. The water phase was discarded and the organic phase saturated with water at that temperature was reheated and recycled to the hydrogel bed. The process was continued until single phase clear liquid was passing through the phase separator. The time required for this to happen was noted. At that time, the circulation was stopped and the liquid remaining was vented. A dry, powdery product was recovered.

Each treated sample was activated by calcining at 1600° F. (871° C.) for five hours in a fluidized bed and a portion thereof was employed in a particle form polymerization process to polymerize ethylene. A stainless steel stirred reactor containing 1¼ lbs. (568 g) isobutane as the diluent was employed. In each instance the reaction was conducted at 230° F. (110° C.) and 550 psig (3792 kPa) in the absence of hydrogen. The melt index of each recovered polymer, compared at a productivity of 5000 g polymer per g catalyst, was determined in accordance with the procedure of ASTM D1238-62T, condition E. The results obtained are given in Table I A for azeotrope distillation and Table I B for continuous extraction.

TABLE I A

MELT INDEX RESULTS FROM AZEOTROPE DRIED CATALYST

| Run No. | Organic Compound Used | Remarks | Water[a] Removal Time (Minutes) | Polyethylene Melt Index |
|---|---|---|---|---|
| 1 | ethyl acetate | control standard | 100 | 6.3 |

TABLE I A-continued
MELT INDEX RESULTS FROM AZEOTROPE DRIED CATALYST

| Run No. | Organic Compound Used | Remarks | Water[a] Removal Time (Minutes) | Polyethylene Melt Index |
|---|---|---|---|---|
| 2 | butyl acetate | control | 31 | 4.3 |
| 3 | amyl acetate | control | 25 | 3.4 |
| 4 | methyl isobutyl ketone | control | 31 | 4.9 |
| 5 | 2-pentanone | control | 40 | 5.9 |
| 6 | 3-pentanone | control | 40 | 4.7 |
| 7 | n-butanol | control | 26 | 4.8 |
| 8 | isobutanol | control | 39 | 4.9 |
| 9 | 2-methyl-1-butanol | control | 31 | 6.4 |
| 10 | 3-methyl-1-butanol | invention | 30 | 7.2 |
| 11 | 2,2-dimethyl-1-propanol | invention | 41 | 6.7 |
| 12 | 1-pentanol | invention | 30 | 7.2 |
| 13 | 2-pentanol | invention | 37 | 7.2 |
| 14 | 4-methyl-2-pentanol | invention | 35–40 | 6.8 |
| 15 | 1-hexanol | invention | 20 | 6.9 |
| 16 | 2-ethyl-1-butanol | control | 35 | 6.0 |
| 17 | cyclohexanol | control | 60 | 5.2 |
| 18 | 2-ethyl-1-hexanol | control | 29 | 5.3 |

[a]Water removal time calculated as the time liquid started to fill the receiver until the liquid coming into the receiver was clear.

TABLE I B
MELT INDEX RESULTS FROM CONTINUOUS EXTRACTED CATALYST

| Run No. | Organic Compound Used | Remarks | Water[a] Removal Time (Minutes) | Polyethylene Melt Index |
|---|---|---|---|---|
| 19 | ethyl acetate standard | control | 105 | 6.4 |
| 20 | isopropyl ether | control | 450 | 1.1 |
| 21 | diethyl ketone | control | 245 | 6.1 |
| 22 | 4-methyl-2-pentanone | control | 285 | 5.5 |
| 23 | isobutanol | control | 30 | 5.8 |
| 24 | 3-methyl-1-butanol | invention | 105 | 7.5 |
| 25 | 4-methyl-2-pentanol | invention | 200 | 7.1 |
| 26 | cyclohexanol | control | 60 | 4.6 |

[a]Water removal time calculated as the time liquid was begun to be pumped through the heated section containing the sample until the cooled effluent was clear.

Ethyl acetate has been previously shown to be an excellent agent for either an azeotrope process or continuous extraction process in removing water from the silica-titania hydrogels based on the high melt index of polyethylene produced from catalyst prepared frm the treated hydrogels. Thus, a melt index of about 6.4 is considered to be a bench mark.

Inspection of the results presented in the tables shows that the specified alcohols of this invention as given in runs 10–15 and 24–25 are even superior to the ethyl acetate results in runs 1 and 19. Of the five 5-carbon alcohols tested, 2-methyl-1-butanol (active amyl alcohol) run 9 was equivalent to ethyl acetate in performance. The other four, 5-carbon alcohols gave superior results with polymer made over the catalysts exhibiting melt indices ranging from 6.7 to 7.2 Two 6-carbon alcohols, 1-hexanol (run 15) and 4-methyl-2-pentanol (run 14) also gave superior results but 2-ethyl-1-butanol (run 16) and cyclohexanol (run 17) gave results inferior to those of ethyl acetate. In run 18, an 8-carbon alcohol was tested and found to give results also inferior to those of ethyl acetate.

The results also show azeotropic distillation and continuous extraction give comparable results based on the melt index of polymer made from the resulting catalysts. Thus, 3-methyl-1-butanol used to treat the hydrogel yielded catalyst which gave 7.2 melt index polymer when azeotropic distillation was practiced (run 10) and 7.5 melt index polymer when continuous extraction was practiced (run 24). However, less time is generally required for azeotropic distillation.

A number of control runs utilizing other alcohols and ketones having from 4 to 7 carbon atoms per molecule were made. The results obtained showed all the agents to be inferior to ethyl acetate in producing high melt index polyethylene. Although any solent in which water is partially soluble can be useful in treatment of a hydrogel to remove water thereby producing large pore catalyst support, only those solvents described above have been found useful in dehydration to produce supported catalysts capable of high melt index ethylene polymerization.

We claim:

1. A method for producing a polymer of ethylene having a melt index in excess of about 6.6 in a particle form polymerization process comprising reacting ethylene monomer at conditions to produce a polymer in the presence of a catalyst produced by:
   (1) forming a silica-containing hydrogel;
   (2) impregnating said hydrogel with an amount of a chromium-containing compound suitable for catalyzing an ethylene polymerization reaction;
   (3) treating said hydrogel to remove water with an aliphatic alcohol chosen from the group consisting of 1-pentanol, 3-methyl-1-butanol, 4-methyl-2-pentanol, 2,2-dimethyl-1-propanol and 1-hexanol, said treating comprising azeotropic distillation or continuous extraction;
   (4) removing said alcohol from the water-free gel thereby recovering a solid, particulate material; and
   (5) calcining said particulate material in a substantially dry, molecular oxygen-containing gas at a temperature and for a time sufficient to activate the catalyst.

2. A method for producing a polymer of ethylene having a melt index in excess of about 6.6 in a particle form polymerization process comprising reacting ethylene monomer at conditions to produce a polymer in the presence of a catalyst produced by:
   (1) forming a silica-containing hydrogel;
   (2) treating said hydrogel to remove water with an aliphatic alcohol chosen from the group consisting of 1-pentanol, 3-methyl-1-butanol, 4-methyl-2-pentanol, 2,2-dimethyl-1-propanol and 1-hexanol, said treating comprising azeotropic distillation or continuous extraction;
   (3) removing said alcohol from the water-free gel thereby recovering a solid, particulate material;
   (4) impregnating the xerogel produced by step (2) with an amount of a chromium compound suitable for catalyzing an ethylene polymerization reaction; and
   (5) calcining said particulate material in a substantially dry, molecular oxygen-containing gas at a temperature and for a time sufficient to activate the catalyst.

3. A method of claim 1 wherein said polymerization is carried out at a temperature within the range of about 100° to about 250° F. and pressure ranging from about 100 to about 700 psia.

4. A method of claim 2 wherein said polymerization is carried out at a temperature within the range of about 100° to about 250° F. and pressure ranging from about 100 to about 700 psia.

5. A method of claim 1 wherein the reaction is carried out in a liquid hydrocarbon diluent in which substantially all the polymer formed is insoluble thereby producing a polymer in a solid particle form.

6. A method of claim 2 wherein the reaction is carried out in a liquid hydrocarbon diluent in which substantially all the polymer formed is insoluble thereby producing a polymer in a solid particle form.

7. A method of claim 5 wherein the diluent is a paraffin or cycloparaffin having about 3 to about 12 carbon atoms per molecule.

8. A method of claim 6 wherein the diluent is a paraffin or cycloparaffin having about 3 to about 12 carbon atoms per molecule.

9. A method of claim 1 wherein hydrogen is present during the reacting of the ethylene monomer.

10. A method of claim 2 wherein hydrogen is present during the reacting of the ethylene monomer.

11. A method of claim 5 wherein the catalyst concentration is about 0.001 to about 10 weight percent based on the total weight of the reactor contents.

12. A method of claim 6 wherein the catalyst concentration is about 0.001 to about 10 weight percent based on the total weight of the reactor contents.

* * * * *